Jan. 6, 1948.     J. F. HYNEK     2,433,907
PISTON RING EXPANDER
Filed April 25, 1945
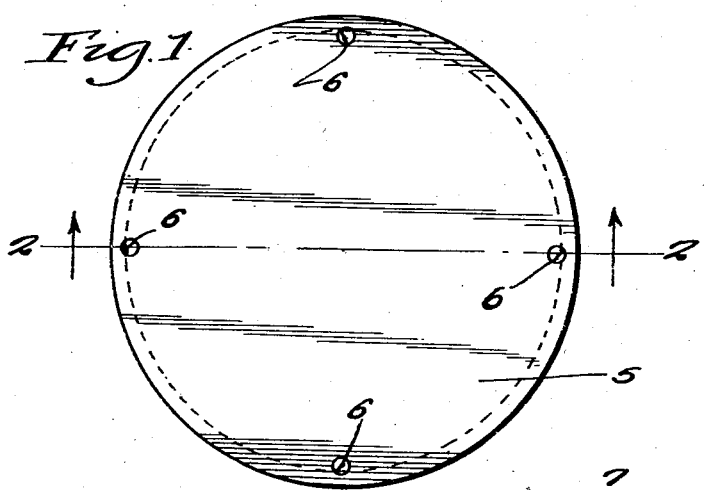
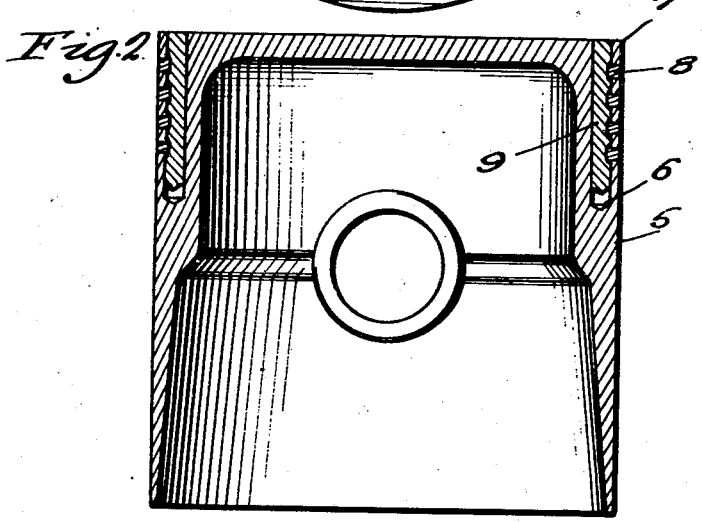
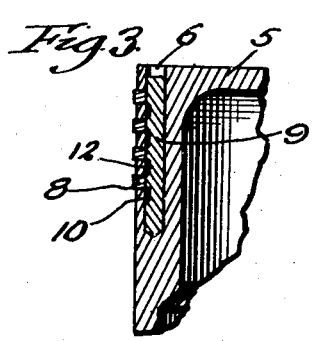
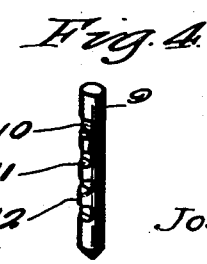
Inventor
Joseph F. Hynek Patented Jan. 6, 1948

2,433,907

UNITED STATES PATENT OFFICE 2,433,907

PISTON RING EXPANDER

Joseph F. Hynek, Smithton, Pa.

Application April 25, 1945, Serial No. 590,242

2 Claims. (Cl. 309—35)

The present invention relates to new and useful improvements in pistons for the cylinders of internal combustion engines, as well as for other types of pistons where packing rings are employed and the invention has for its primary object to provide means for expanding the rings when the latter become worn and holding the rings in their expanded position.

More specifically, the invention embodies the provision of a plurality of pins inserted longitudinally in the top of the piston behind the piston ring, the pins having vertically spaced grooves therein for receiving the piston rings, the grooves having sloping side walls by means of which the pins may be driven downwardly into the piston to move the rings out of the grooves into engagement with the outer surface of the pin whereby to expand the rings in the piston to take up wear caused in the rings.

A further object of the invention is to provide a piston ring expanding device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the piston.

Figure 2 is a vertical sectional view taken substantially on a line 2—2 of Figure 1.

Figure 3 is a fragmentary vertical sectional view of one side of the piston and showing the rings in expanded position, and Figure 4 is a perspective view of one of the expanding pins.

Referring now to the drawings in detail wherein for the purpose of illustration I have disclosed a preferred embodiment of the invention, the numeral 5 designates a piston of a type adapted for use in the cylinder of an internal combustion engine, the piston having a plurality of longitudinally extending openings 6 extending downwardly from the top of the piston adjacent the side walls thereof and communicating with the grooves 7 formed in the sides of the piston for receiving the usual expanding piston rings 8.

Pins 9 are adapted for insertion in the openings 6, one side of the pins having a plurality of longitudinally spaced transverse grooves 10 formed therein, the grooves having sloping front and rear side walls 11 and the section of the pins between the grooves thus forms a plurality of lugs or protuberances 12.

In the operation of the device when the piston rings 8 are new the pins 9 are driven downwardly in the openings 6 into a position so that the rings 8 will be seated in the respective grooves 10 of the pins.

After the outer surfaces of the rings 8 have become worn, the pins 9 are then driven downwardly further in the openings 6 so that the rings 8 will ride out of the grooves 10 and the lugs or protuberances 12 will then be positioned immediately behind the respective rings as shown to advantage in Figure 3 of the drawings whereby to expand the rings and thus take up wear between the rings and the cylinder walls.

When the rings 8 have become so worn that the same must be replaced, the pins 9 are withdrawn sufficiently to be returned to the position as illustrated in Figure 2 of the drawings so that when new rings are applied, the same will seat in the grooves 10.

The pins 9 may be returned by means of any suitable tool which, not being part of my invention, has not been illustrated. The sloping side walls 11 prevent the pins 9 from catching on the edges of the piston rings 8 while said pins are being driven or withdrawn.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what I claim is:

1. A piston having annular piston ring grooves formed therein and adapted for seating piston rings therein, said piston having a plurality of openings extending downwardly from the top of the piston adjacent the side walls thereof and communicating with said grooves and pins adapted for insertion in said openings and having vertically spaced grooves in one side thereof adapted to register with the grooves of the piston for seating the rings in the grooves of the pins, said pins having raised portions on its surface between said grooves and adapted for engagement behind the rings upon a predetermined downward movement of the pins in the openings to expand the rings.

2. A piston having annular piston ring grooves formed therein and adapted for seating piston rings therein, said piston having a plurality of openings extending downwardly from the top of the piston adjacent the side walls thereof and communicating with said grooves and pins adapted for insertion in said openings and having longitudinally spaced grooves therein adapted to register with the grooves of the piston for seating the rings therein, said pins intermediate said grooves having raised portions adapted for engagement behind the rings upon a predetermined downwardly movement of the pins in the openings to expand said rings, said grooves of the pins having sloping side edges adapted for riding the rings out of the grooves to expand the rings upon a predetermined vertical movement of the pins in the openings downwardly and upwardly respectively.

JOSEPH F. HYNEK.

REFERENCES CITED

The following references are of record in the file of this patent:

UNITED STATES PATENTS

| Number | Name | Date |
|---|---|---|
| 495,221 | Greene | Apr. 11, 1893 |
| 1,959,566 | Brubaker | May 22, 1934 |
| 2,009,766 | Corrigan | July 30, 1935 |
| 1,386,097 | Fisher | Aug. 2, 1921 |

FOREIGN PATENTS

| Number | Country | Date |
|---|---|---|
| 547,172 | France | Sept. 13, 1922 |